Feb. 3, 1959   H. B. MEAD   2,871,792
HYDRAULIC VARIABLE SPEED GEAR
Original Filed June 25, 1952   2 Sheets-Sheet 2
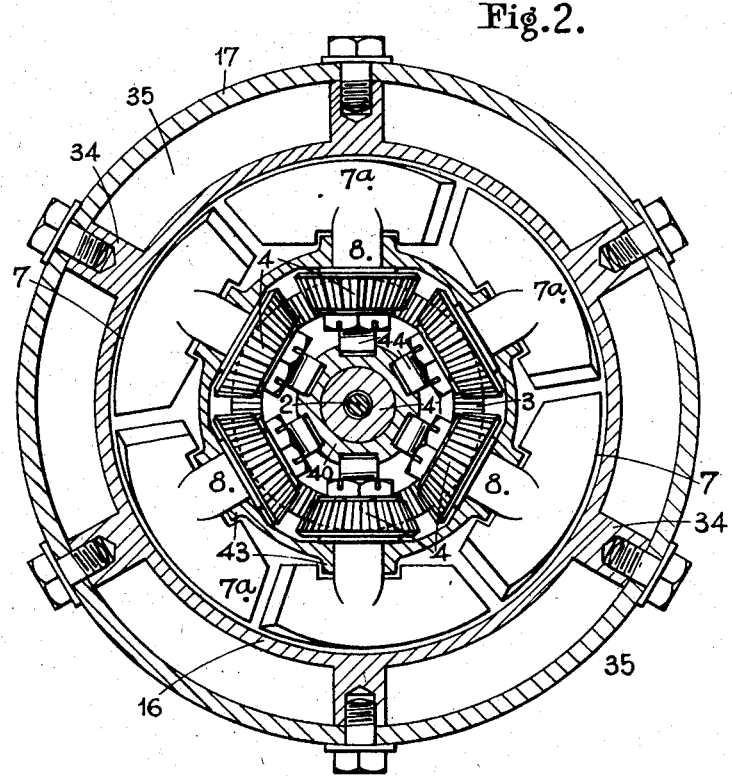
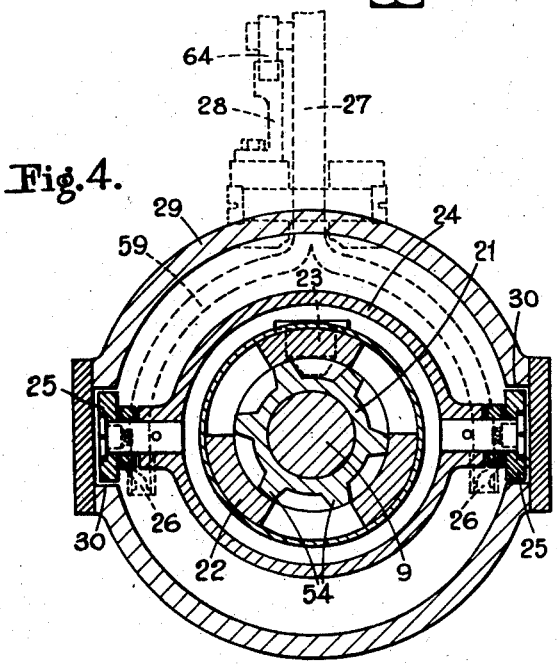
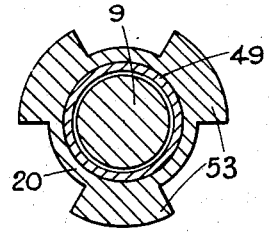
INVENTOR
HAROLD B. MEAD

United States Patent Office 2,871,792
Patented Feb. 3, 1959

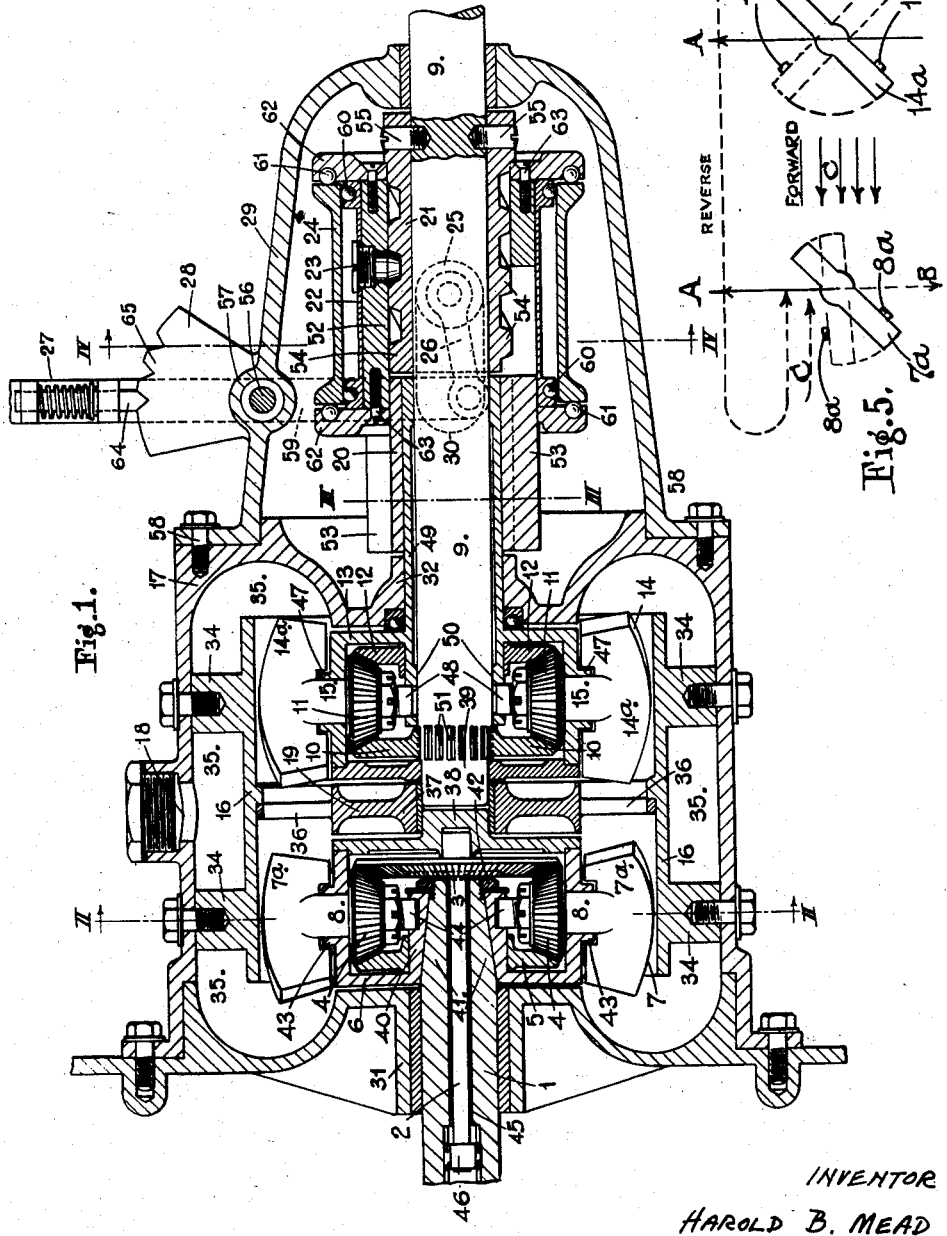

2,871,792

HYDRAULIC VARIABLE SPEED GEAR

Harold Bertram Mead, Ashford, England

Original application June 25, 1952, Serial No. 295,518, now Patent No. 2,754,764, dated July 17, 1956. Divided and this application May 24, 1956, Serial No. 587,085

Claims priority, application Great Britain July 4, 1951

1 Claim. (Cl. 103—89)

This application is a division of my application Serial No. 295,518 filed 25th June 1952 relating to hydraulic variable speed gear and which application matured into Patent No. 2,754,764, July 17, 1956.

The objects of the present invention are to provide an improved form of transmission between pump and turbine sides of a hydraulic variable speed gear and in particular to provide a robust turbine unit which is sensitive to differential loading on the hydraulic circuit to effect automatic change of gear to said such loading, which gives forward and reverse gear operation in a comparatively simple way; which is economical in manufacture and maintenance and provides a positive drive at all transmission ratios in both forward and reverse drives.

The objects of the invention and how they are achieved will be readily understood by reference to the accompanying drawings, which illustrate, by way of example, and somewhat diagrammatically, a practical form embodied in a complete hydraulic unit comprising pump and turbine units. In the drawings:

Figure 1 is a longitudinal section of the hydraulic gear unit, particularly suitable for road vehicle drives;

Figure 2 is a section on the line II—II of Figure 1;

Figure 3 is a section taken on the line III—III of Figure 1 and

Figure 4 is a section taken generally on the line IV—IV of Figure 1 with the gear lever shown dotted;

Figure 5 shows diagrammatically the relative pitch positions of a pair of driven and driving blades.

In its simple compact form as shown the turbine unit is embodied in a hydraulically sealed casing 17 of rectangular or cylindrical shape which is filled with the power transmitting liquid, such as oil, through a filling orifice 18 which is closed by a suitable plug or cap. The casing has concentric bearings 32, 31 on opposite sides to house axially aligned input (driving) and output (driven) shafts 9, 1 which each carry at their respective inner and opposed ends within the main casing 17 a differential gear housing namely 13 for the input or pump unit and 6 for the turbine unit. The housings 13 and 6 form the hubs of the respective input and driven screws 14 and 7 which lie within an inner drum 16 open at the ends and secured to and in spaced relation from the outer casing 17 by radial arms 34 to form an annular torus chamber 35. This torus chamber 35 is closed at the ends by curved end passages as shown to provide a closed hydraulic circuit for each pair of adjacent blades 14a, 7a, i. e. one blade of each screw in longitudinal juxtaposition making up the pair. Between the pump unit housing 13 and the turbine unit housing 6 there is provided a central guide 19 having peripherally spaced openings 36 to allow of direct passage of fluid between the driving blades 14 and the driven blades 7 with no intervening guide blades. The central guide 19 is fixed at its outer periphery to the inner drum 16, while its apertured hub 37 provides end bearings for the hub 38 of the driven gear housing 6 and for the inner end 39 of the driving shaft 9.

Differential gears connect together the individual blades 14a, 14a and 7a, 7a of the groups of pairs making up the pump and turbine screws respectively. The turbine unit differential comprises a sun wheel assembly which in the form shown consists of a pair of parallel (or sun) bevels 3, 5, one (3) being relatively fixed and the other (5) being loose on the axial boss 40 of the driven gear housing 6 which is secured on a tapered spigot 41 of driven shaft 1 by a locking nut 42. Two opposite bevels 4 (planet) at right-angles and in permanent mesh with the sun bevels 3, 5 complete the driven differential gear. The planet wheels 4 are carried on the tapered inner ends of stub shafts 8 which are each mounted radially between a bearing boss 43 on the housing 6 and a step bearing 44 in the axial boss 40 of the said housing. On the outer end of each stub shaft 8 is mounted the blade 7a (which may be flat or curved) which is axially offset to provide a larger area on one side of the stub shaft 8 than on the other whereby differential pressure in the hydraulic circuit causes an unbalance on the loading of the blade so that it will turn about the stub shaft axis to compensate for the change of pressure, and thus alter the effective gear ratio.

In the present example, there are six turbine screws 7 (see Figure 2) and six complementary pump screws 14, the turbine screws having variable pitch blades 7a while the blades 14a of the pump screws 14 are normally relatively fixed, but are capable of adjustment to give reverse and neutral gear as will hereinafter be described.

To control the variable pitch blades 7a of the turbine screws, a torsion rod 2 is mounted within a tubular housing formed by an axial bore 45 in the driven shaft 1, being splined to the latter at one end 46 and carrying at the other end the sun wheel 3, the complementary sun wheel 5 being the idler of the differential gear and running loosely on the axial boss 40 of the housing 6 as above described.

In the present embodiment the pump unit screws 14 are constructed and arranged similarly to the turbine unit screws 7 except that they do not have automatically variable pitch blades 14a, and in the present example, the blades are not offset from the axes of their shafts 15. Thus the screws are connected to the input or driving shaft 9 by a common differential gear comprising a pair of sun wheels 10 and 12 which are in mesh with planet wheels 11 each carried upon the tapered end of the stub shaft 15 radially mounted between an outer bearing in the boss 47 of the gear housing 13 and an inner footstep bearing 48 in an inner boss 50 of a tubular extension 49 of the said housing 13 which is rotatably free upon the driving shaft 9 but adapted to be coupled thereto by a change speed device to be hereafter discussed. The sun wheel 10 is splined to the inner end of the driving shaft 9 as at 51, while the sun wheel 12 is the idler of the differential being rotatably free upon the exterior of the boss 50 of the gear housing extension 49. At the outer ends of the radial stub shafts 15 are fixed the driving blades 14a, which are held by the change speed device aforesaid at 45 degrees pitch (parallel to the driven or turbine unit blades 7a) when in highest gear ratio for forward running. The change speed device provides for manually setting the driving blades by turning them through 45 degrees to give a fully feathered (neutral gear) position and through 90 degrees for reverse gear. Figure 5 shows diagrammatically one pair of complementary driven and driving blades 7a and 14a, the full lines showing the blades in forward running (highest gear) position while the dotted lines show the same blades in lowest gear for the driven blades 7a and reverse gear for the driving blades 14a. In this figure the full line arrows A show the direction of rotation in forward running position of the driving and driven screws (and the driving and driven shafts 9 and 1), the dotted arrow B the reverse rotation of the driven shaft 1 when the driving blades 14a are set to reverse gear position (dotted), and the horizontal arrows C show the direction of pressure of the liquid in the hydraulic circuit 35.

It will be noted that the turbine unit blades 7a rotate due to variable hydraulic loading against the resistance of the torsion rod 2, their angular adjustment about the axes of their respective stub shafts 8 being limited to an amount up to 45 degrees which may be determined by suitable stops 8a, Figure 5 only.

The change speed device, which holds the driving (pump) blades normally relatively stationary in angularly set position with respect to the radial axis so that there is no automatic pitch adjustment as in the turbine unit blades, may consist of a helical screw or worm which can be operative at all speeds, and if required, can be safely used as an emergency brake. In this device the pump unit or driving gear housing 13 is revolvable about the common axis of input and driven shafts 9 and 1 respectively to change the setting of blades 14a but is controlled by being connected to driving shaft 9 by a radial tooth 23 (or teeth) which projects internally from a sleeve 22 rotatable with but slidable axially upon the tubular extension 49 of the driven gear housing 13, being connected to the extension 49 by internal splines 52 which are permanently in mesh with external splines 53 of sleeve 20 (Figure 3) which is fixed to the housing extension 49. The radial tooth 23 (or each such radial tooth) engages in the helical teeth 54 of a sleeve 21, which is rigidly fixed upon the driving shaft 9 as by shrinking and/or the fixing screws 55. It will thus be seen that the drive from the driving shaft 9 is through the hydraulic circuit via the driving screws 14, the stub shafts 15, the planet wheels 11 and sun wheel 10, and also via the gear housing 13 and tubular extension 49 thereof, the splined sleeve 20, the toothed sleeve 22 with its tooth 23 (or teeth) and the sleeve 21. Thus with the sleeve 22 held fixed axially in the rearward position (forward drive) as shown, no relative motion as between sun and planet wheels can take place so that the pitch of the driving blades 14a is held fixed. In consequence the rotation of shaft 9 in forward drive transmits through the hydraulic circuit corresponding rotation to the driven shaft 1. When the toothed sleeve 22 is moved axially to the left as viewed in Figure 1, the helical teeth on the sleeve 21 cause the toothed sleeve 22 to turn with the result that the sleeve 20 and gear housing 13 are correspondingly rotated so that the planet wheels 11 roll on the sun wheel 10 and thus the driving blades 14a are angularly adjusted towards the reverse drive position. This change of pitch angle of the driving screw blades is assisted by the pressure of liquid applied to the blades 14a. When they reach the "fully feathered" position—which is midway to the fully coarse pitch of the reverse gear (or vice versa) after 45 degrees of turning as will be readily understood from Figure 5—the blades 14a will be edge on to the hydraulic pressure, i. e. the gear will be in neutral. As the blades 14a pass the mid or neutral position, the hydraulic pressure acts on the reverse side thereof and thus if the driving shaft 9 is rotating in the forward (or reverse as the case may be) direction, the driving blades 14a act as a powerful brake as the pitch coarsens.

The change speed gear device shown provides for positive adjustment of the driving blades 14a and obviates the need for precise timing. Axial movement of the sleeve 22 is effected by the change gear lever 27 which is carried by a pivot 56 which in turn is supported in a bearing boss 57 forming part of an extension 29 of the gear casing 17 being secured thereto by bolts 58. The gear lever 27 has two fork arms 59 forming a stirrup within the casing 29 which straddles the driving shaft 9 and associated sleeve assemblies of the gear change device. The ends of the arms 59 are connected by links 26 to an outer sleeve 24 which surrounds the sleeve 22 and is rotatably mounted thereon by means of bearings 60, being axially located by thrust bearings 61 at each end which are carried in end plates 62 which are secured to the sleeve 22 by screws 63. The outer sleeve 24 is rotatably anchored by means of rollers 25 (Figure 4) which engage in axial guides 30 provided in the casing 29 and parallel to the axial path of movement of the sleeve 22. Thus the outer sleeve 24 can move axially when the gear lever 27 is adjusted but does not rotate when the sleeve 22 rotates with the driving shaft 9.

Axial adjustment of the sleeve 22 in forward, neutral and reverse gear positions is held by a spring controlled catch 64 on the gear lever 27 which co-operates with a toothed quadrant 28 fixed to the casing extension 29, the catch being releasable from the teeth 65 of the quadrant 28 by hand manipulation when the operator is gripping the gear lever 27.

The above described construction provides an infinitely variable hydraulic gear in which are available transmission ratios progressively and continuously from 1:1 when the pitch of the driven screw blades coincides with that of the driving screw blades down to zero when the driven blades have fined to 45 degrees where they impart no resistance to the liquid in the hydraulic circuit. A suitable arrangement of stops ensures the range of angular variation of the blades being restricted to 45 degrees in the turbine screw (stops 8a) and 90 degrees in the pump screw (stops 15a).

In this case it will be observed from the foregoing that the driving blades are normally of fixed but adjustable pitch (and are either balanced (as shown) or they may be offset on their stub shafts similarly to the driven blades shown) while, the driven blades 7a are controlled by the torsion rod 2 and are continuously adjustable as to pitch by the differential of hydraulic pressure arising from differential loading of the driving shaft 9 and driven shaft 1. In such an embodiment the twist in the torsion rod as the blades are adjusted by the differential hydraulic loading provides energy for restoring the blades as the differential loading reduces, and it will be apparent that fining of the pitch is obtained by the drag created by the inertia of the vehicle or other body which is powered by the driven shaft 1. It is a feature of the arrangement according to the invention that the intrinsic design provides for a reversal of the action in the case of overdrive by the driven shaft 1, in which case the pump blades 14a become the turbine or driven blades and the turbine blades 7a the driving or pump unit.

I claim:

In a variable speed hydraulic coupling, a pump unit comprising an input shaft, an annular chamber in concentric surrounding relation to said shaft, a gear housing concentrically surrounding said shaft and disposed within said chamber, impeller blades disposed within said chamber, said impeller blades each being provided with a stub shaft, said housing being provided with a tubular extension in which said shaft is rotatably disposed, said stub shafts being radially disposed relative to said input shaft and being rotatably mounted in said housing with their inner free ends rotatably supported in bosses on said tubular extension, a planet wheel supported by each of said stub shafts and being disposed within said housing, a sun wheel disposed within said housing and being connected to said input shaft, said sun wheel meshing with said planet wheels, an idler sun wheel disposed within said housing and meshing with said planet wheels, a first sleeve surrounding and secured to said tubular extension and being provided with external splines, a second sleeve surrounding said input shaft and being provided with internal splines engaged with said external splines, said last sleeve being provided with a radially inwardly extending tooth, a third sleeve disposed within the last named sleeve and being secured to said input shaft, and being provided with helical teeth with which said tooth cooperates, and manual means engaged with said internally splined sleeve for moving same axially of said input shaft and impeller blades for desired angular adjustment of the latter.

References Cited in the file of this patent

UNITED STATES PATENTS

| | | |
|---|---|---|
| 2,178,356 | Brunner | Oct. 31, 1939 |
| 2,471,179 | Wemp | May 24, 1949 |
| 2,679,299 | Kelson | May 25, 1954 |
| 2,754,764 | Mead | July 17, 1956 |

FOREIGN PATENTS

| | | |
|---|---|---|
| 619,120 | France | Dec. 27, 1926 |